United States Patent
Shaffer et al.

(10) Patent No.: US 11,144,641 B2
(45) Date of Patent: Oct. 12, 2021

(54) METHOD OF DETECTING REPLAY ATTACKS IN A FINGERPRINT SENSOR SYSTEM

(71) Applicant: NEXT Biometrics Group ASA, Oslo (NO)

(72) Inventors: Jamie Lyn Shaffer, Bothell, WA (US); Mark William Naumann, Los Gatos, CA (US)

(73) Assignee: NEXT Biometrics Group ASA, Oslo (NO)

( * ) Notice: Subject to any disclaimer, the term of this patent is extended or adjusted under 35 U.S.C. 154(b) by 119 days.

(21) Appl. No.: 16/796,611

(22) Filed: Feb. 20, 2020

(65) Prior Publication Data
US 2020/0327226 A1 Oct. 15, 2020

Related U.S. Application Data

(60) Provisional application No. 62/808,362, filed on Feb. 21, 2019.

(51) Int. Cl.
*G06F 21/55* (2013.01)
*G06F 21/32* (2013.01)
(Continued)

(52) U.S. Cl.
CPC .......... *G06F 21/554* (2013.01); *G06F 21/32* (2013.01); *G06F 2221/031* (2013.01)

(58) Field of Classification Search
CPC .. G06F 21/554; G06F 21/32; G06F 2221/031; G06K 9/00107; G06K 9/036; G06K 9/00087
See application file for complete search history.

(56) References Cited

U.S. PATENT DOCUMENTS

| 8,437,513 B1 * | 5/2013 | Derakhshani | G06K 9/00597 |
| | | | 382/115 |
| 10,817,722 B1 * | 10/2020 | Raguin | G06K 9/0061 |

(Continued)

OTHER PUBLICATIONS

Ratha N K et al. "Enhancing Security and Privacy in Biometrics-based Authentication Systems," IBM Systems Journal, Jan. 2001, vol. 40, No. 3, pp. 614-634 (Year: 2001).*

*Primary Examiner* — Darren B Schwartz
(74) *Attorney, Agent, or Firm* — Duane Morris LLP

(57) ABSTRACT

Systems and methods for detecting replay attacks on a biometric-based authentication system are disclosed herein. In some embodiments, the method includes generating a command set causing a fingerprint sensor to sequentially conduct a scan of pixels in the fingerprint sensor, wherein the command set includes one or more replay attack detection commands causing the fingerprint sensor to capture replay attack detection data, sending the commands to the fingerprint sensor, receiving fingerprint data, and evaluating the fingerprint data for the replay attack detection data. In some embodiments, the one or more replay attack detection commands include repeating the scan of a selected row of pixels, providing insufficient bias to a selected row of pixels, and/or providing too much bias to a selected row of pixels. In some embodiments, the replay attack detection commands are randomly generated for each scan. Various other aspects of the technology are described herein.

19 Claims, 10 Drawing Sheets

(51) Int. Cl.
*G06K 9/00* (2006.01)
*G06K 9/03* (2006.01)

(56) References Cited

U.S. PATENT DOCUMENTS

| | | | | |
|---|---|---|---|---|
| 2003/0126448 A1* | 7/2003 | Russo | H04L 9/3231 | 713/186 |
| 2003/0202687 A1* | 10/2003 | Hamid | G06K 9/00899 | 382/124 |
| 2004/0208349 A1* | 10/2004 | Ide | H04N 1/00827 | 382/124 |
| 2006/0215887 A1* | 9/2006 | Nishimura | G06K 9/0012 | 382/124 |
| 2006/0274921 A1* | 12/2006 | Rowe | G06K 9/2018 | 382/124 |
| 2006/0285729 A1* | 12/2006 | Kim | G06K 9/00026 | 382/124 |
| 2007/0165911 A1* | 7/2007 | Baentsch | G07C 9/257 | 382/115 |
| 2008/0209226 A1* | 8/2008 | Venkatesan | H04L 9/3231 | 713/186 |
| 2008/0253625 A1* | 10/2008 | Schuckers | G06K 9/00107 | 382/125 |
| 2013/0138964 A1* | 5/2013 | Joyce, III | G06Q 20/40145 | 713/176 |
| 2014/0281946 A1* | 9/2014 | Avni | G06K 9/00194 | 715/268 |
| 2014/0294262 A1* | 10/2014 | Schuckers | G06K 9/00073 | 382/125 |
| 2016/0070967 A1* | 3/2016 | Du | G06T 7/32 | 382/124 |
| 2016/0078270 A1* | 3/2016 | Lee | G06K 9/001 | 382/125 |
| 2017/0090024 A1* | 3/2017 | Kitchens, II | A61B 8/5223 | |
| 2017/0090028 A1* | 3/2017 | Djordjev | G01S 7/521 | |
| 2017/0110130 A1* | 4/2017 | Sharifi | G10L 15/1815 | |
| 2017/0231534 A1* | 8/2017 | Agassy | G06K 9/0002 | 382/124 |
| 2017/0351848 A1* | 12/2017 | Bakish | G06F 21/32 | |
| 2018/0012094 A1* | 1/2018 | Wu | G06K 9/00255 | |
| 2018/0034852 A1* | 2/2018 | Goldenberg | H04L 63/1483 | |
| 2018/0196988 A1* | 7/2018 | Tse | G06F 21/32 | |
| 2018/0239955 A1* | 8/2018 | Rodriguez | G06F 21/32 | |
| 2018/0260643 A1* | 9/2018 | Sheikh Faridul | G06K 9/00261 | |
| 2019/0044723 A1* | 2/2019 | Prakash | H04L 9/3234 | |
| 2020/0175291 A1* | 6/2020 | Kitchens | G06K 9/0002 | |
| 2020/0309930 A1* | 10/2020 | Zhou | G01S 15/32 | |

\* cited by examiner

| Sample Number | Sample Instructions |
|---|---|
| 1 | Normal Scan — 532 |
| 2 | Repeat Scan, Insufficient Bias — 534 |
| 3 | Normal Scan |
| 4 | Repeat Scan of Previous Row — 536 |
| 5 | Repeat Scan of Previous Row |
| 6 | Repeat Scan of Previous Row |
| 7 | Normal Scan |
| 8 | Normal Scan |
| 9 | Normal Scan |
| 10 | Normal Scan |
| 11 | Repeat Scan, Over Bias — 538 |
| 12 | Normal Scan |
| 13 | Normal Scan |
| 14 | Normal Scan |
| 15 | Normal Scan |

*FIG. 5*

| Sample Number | Check Sample Instructions |
|---|---|
| 2 | Check for Under-Biased Line |
| 4 | Check for Repeat Line |
| 5 | Check for Repeat Line |
| 6 | Check for Repeat Line |
| 11 | Check for Over-Biased Line |

*FIG. 7*

METHOD OF DETECTING REPLAY ATTACKS IN A FINGERPRINT SENSOR SYSTEM

CROSS-REFERENCE TO RELATED APPLICATION(S)

This application claims priority to U.S. Provisional Patent Application No. 62/808,362 filed on Feb. 21, 2019, the entirety of which is incorporated herein by reference.

TECHNICAL FIELD

The present technology relates to verifying the validity of biometric information. More specifically, the present technology relates to systems and methods for detecting replay attacks on a fingerprint sensor system.

BACKGROUND

A smart card, or integrated circuit card (ICC), is a physical electronic authorization device used to control access to a resource. A smart card may additionally utilize biometrics to establish proof-of-identity, thereby improving secure access to the controlled resource. For example, a smart card with biometrics (also known as a biometric system on card, or BSoC) may store the fingerprint information of a user or users who are authorized to access a controlled resource. During an attempt to access the controlled resource, the BSoC then compares the stored fingerprint information to live fingerprint information captured by the BSoC (for example, using a fingerprint sensor integrated into the BSoC) to verify whether the attempt is being made by an authorized user or by someone else.

One approach to circumventing the security of a BSoC or other biometric-based authenticator is to attack the comparison of live biometric information with stored biometric information. For example, in a replay attack (sometimes referred to as a "playback attack"), an attacker intercepts biometric information that grants access to a controlled resource and stores it. Later, the attacker uses the stored biometric information, which appears to the biometric authenticator to be "live," to gain access to the resource. In other words, by replaying previously-captured biometric information, such as a fingerprint, the attacker deceives the biometric authenticator system into verifying the attacker as an authorized user.

BRIEF DESCRIPTION OF THE DRAWINGS

FIG. 5 illustrates an example table of replay attack detection commands for controlling a fingerprint sensor in a replay attack detection system, in accordance with embodiments of the present technology.

FIG. 7 illustrates an example table of replay detection markers in fingerprint data, used by the replay attack detection system to identify a replay attack in accordance with embodiments of the present technology.

Figure 1:
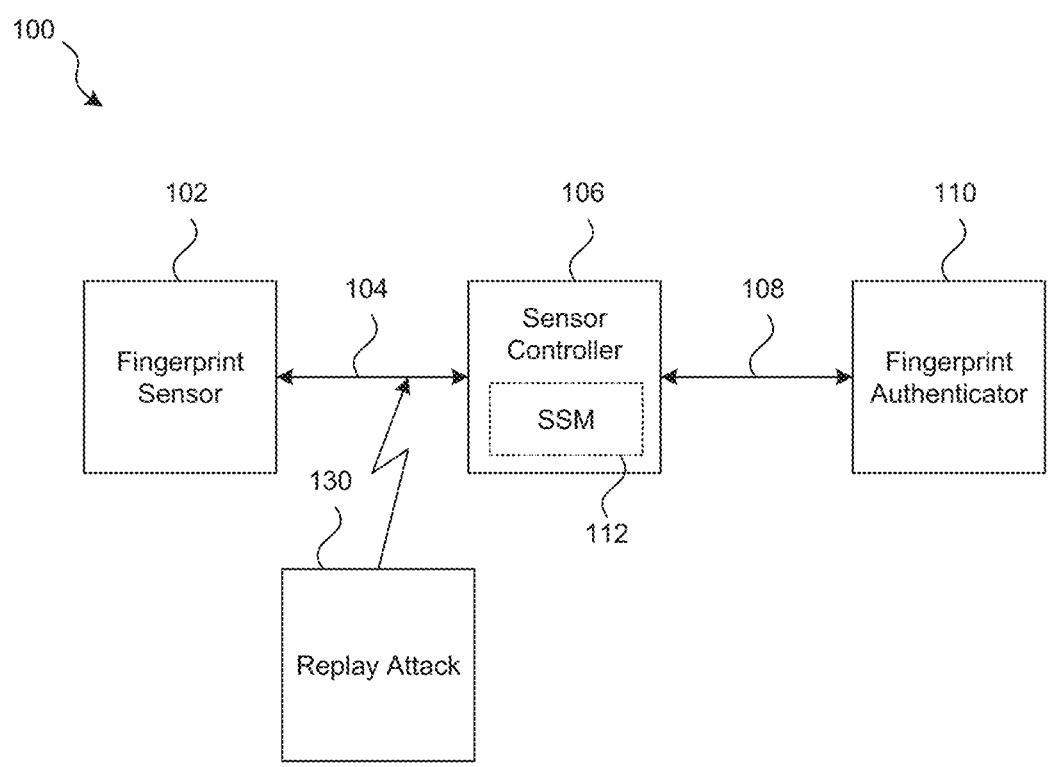
FIG. 1 illustrates an example of an environment in which some implementations of the present technology can be utilized in a system for detecting a replay attack on a biometric system.

The drawings have not necessarily been drawn to scale. Similarly, some components and/or operations can be separated into different blocks or combined into a single block for the purpose of discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

Systems and methods for detecting replay attacks on a biometric-based authenticator, such as a biometric system on card ("BSoC"), are described herein. The BSoC may use biometric information, such as fingerprint data, as a means of identifying an individual to control access to a resource. In various implementations, the BSoC of the replay attack detection system includes a fingerprint sensor, a sensor controller, and a fingerprint authenticator. The fingerprint sensor is an electronic device that captures an image of a fingerprint pattern and generates analog fingerprint data. The fingerprint sensor can be controlled by the sensor controller, which generates a command set to control the sensing operation of the fingerprint sensor (e.g., what location of the sensor array to scan and sensing parameters for the sensor). In some embodiments, the fingerprint sensor transmits the analog fingerprint data to the sensor controller, and the sensor controller transforms this data into digital fingerprint data (e.g. a digital image of the fingerprint or digital data characterizing the features of the fingerprint pattern). In some embodiments, the sensor controller additionally processes the fingerprint data (e.g., filters or removes certain features) or evaluates the fingerprint data. In some embodiments, the sensor controller transmits the digital fingerprint data to the fingerprint authenticator. The fingerprint authenticator receives the digital fingerprint data and evaluates whether the received digital fingerprint data is associated with an authorized user. For example, the fingerprint authenticator can compare the received digital fingerprint data to authorized fingerprint data stored in the BSoC. If a match is found, the fingerprint authenticator confirms the received digital fingerprint data as belonging to an authorized user. In some embodiments the digital fingerprint data (generated by the sensor controller from the analog fingerprint data) and the authorized fingerprint data (stored on the BSoC) is image data.

In some embodiments the fingerprint sensor, the sensor controller, and the fingerprint authenticator are communicatively coupled to one another with different interfaces. For example, the fingerprint sensor and sensor controller can communicate with each other via an analog interface. As a further example, the sensor controller and fingerprint authenticator can communicate with each other via a digital interface.

A replay attack targets the BSoC through the analog interface between the fingerprint sensor and sensor controller by capturing analog fingerprint data being transmitted on the analog interface (for example, capturing a live scan from the fingerprint sensor of the fingerprint of an authorized user), recording the analog fingerprint data (e.g., in a storage area off of the BSoC), then injecting the recorded analog fingerprint data into the analog interface at a later time. By later injecting analog fingerprint data into the analog interface, a replay attacker can manipulate what data is processed and transformed by the sensor controller, and therefore what digital fingerprint data is evaluated by the fingerprint authenticator. In other words, the replay attacker can use previously-captured analog fingerprint data of an authorized user to make it appear as if the authorized user's fingerprint is being captured by the fingerprint sensor. In doing so the replay attack effectively mimics the authorized user, thereby deceiving the BSoC into verifying the replayed fingerprint data as if it was captured live, and as a result granting the replay attacker fraudulent access to the controlled resource.

As described herein, the replay attack detection system protects biometric authenticators from these replay attacks. To do so, the sensor controller generates one or more replay attack detection commands, and includes the replay attack detection commands in the commands sent to the fingerprint sensor to complete a scan. In some embodiments, for example, the one or more replay attack detection commands cause changes in a bias (e.g. voltage bias, thermal bias, light emission, etc.) supplied to any number of pixels in the sensor, which results in changes to the captured analog data from the sensor. In some embodiments, for example, the one or more replay attack detection commands are deviations in the row indexing used when capturing the fingerprint data, which can result in certain rows of fingerprint data being captured multiple times, certain rows of fingerprint data being skipped, certain rows of fingerprint data being captured out of order, etc. In some embodiments, the one or more replay attack detection commands are changes in the gain applied to signals generated by a fingerprint sensor, or changes to the amount of time one or more pixels in a fingerprint sensor are scanned. The commands sent to the fingerprint sensor can include replay attack detection commands causing any combination of deviations. By controlling the deviations to the fingerprint sensor, the sensor controller can detect when received analog fingerprint data is not from the fingerprint sensor operating in according with the generated command set, and therefore is not "live" (i.e., the fingerprint data is indicative of a replay attack).

To determine whether received analog fingerprint data is live or indicative of a replay attack, the system (for example, at the sensor controller) evaluates the analog fingerprint data for markers or data indicators that are consistent with the one or more replay attack detection commands. These markers or data indicators are also referred to herein as "replay attack detection data." For example, if the replay attack detection commands included a change in bias supplied to one sample index row, the sensor controller can check the analog fingerprint data from the sample index row for conformity with the change in bias supplied. As a further example, if the replay attack detection commands include a command to sample an index row multiple times, the sensor controller can check the analog fingerprint data for the presence of the repeated sample. If the analog fingerprint data includes these deviations that are consistent with the replay attack detection commands, the fingerprint data is likely captured live.

The use of replay attack detection commands is advantageous, since they introduce deviations in the analog fingerprint data that can be anticipated by the replay attack detection system but that cannot be anticipated by an attacker. For example, when capturing a fingerprint to determine whether a user is authorized, the sensor controller generates a command set, and therefore only the sensor controller has information regarding the existence of replay attack detection commands that are being transmitted to the fingerprint sensor and causing deviations. Furthermore, the set of replay attack detection commands included can change each time a command set is generated (i.e., each time a fingerprint is being captured by the fingerprint sensor), such that the replay attack detection data expected by the system changes from one fingerprint capture to the next. This allows the fingerprint sensor to implement various checks on the received analog fingerprint data to determine whether a replay attack is occurring.

In some embodiments, the sensor controller processes the fingerprint data to remove data, based on the one or more replay attack detection commands (e.g. to remove replay attack detection data), before sending the fingerprint data to the fingerprint authenticator. In some embodiments the sensor controller uses the fingerprint data with the replay attack detection data to determine the presence of a replay attack, and the fingerprint authenticator uses the fingerprint data without the replay attack detection data to determine if the fingerprint is authorized (i.e., matches a stored fingerprint). In some embodiments the sensor controller processes the fingerprint data to remove replay attack detection data, and the fingerprint authenticator uses the processed fingerprint data to determine whether there is a replay attack based on whether the processed fingerprint data matches any stored fingerprint. Because, in some embodiments, the replay attack detection commands change between scans, if the sensor controller processes fingerprint data to remove data from sensor data that is not live, the processing would likely result in removing data that does not correspond to replay attack detection data. That is, the processing is likely to remove data necessary to match an authorized user in the system. Accordingly, the fingerprint authenticator will reject the fingerprint data submitted by a replay attack at the matching phase in embodiments where the sensor controller does not separately detect for replay attacks. In some embodiments, the sensor controller transmits information regarding the replay attack detection commands to the fingerprint authenticator, thereby enabling the fingerprint authenticator to implement the various checks on the digital fingerprint data to determine whether a replay attack is occurring, as well as process the digital fingerprint data, before comparing to authorized fingerprint data.

It will be appreciated that while the replay attack detection commands are described generally as resulting in deviations in the scan process of an entire row of fingerprint data (i.e., a line or row of pixel data), the replay attack detection commands can cause a deviation in the scan of other shapes of pixels captured by the fingerprint sensor. For example, as used herein, shapes of pixels can refer to various sets of zero or more pixels (e.g. zero pixels, any number of one or more contiguous pixels, any number of one or more non-contiguous pixels, a row of pixels, subsets of a row (contiguous or non-contiguous), a column of pixels, subsets of a column of pixels (contiguous or non-contiguous), and any other combinations or patterns of pixels).

Further, in the following, the replay attack detection system is described in the context of sensors that operate in accordance with the active thermal principle as described in, for example, U.S. Pat. No. 6,091,837 entitled "Sensor For Acquiring a Fingerprint" issued Jul. 18, 2000 and U.S. Pat. No. 7,910,902 entitled "Apparatus for Fingerprint Sensing" issued Mar. 22, 2011, the entirety of each of which are hereby incorporated by reference herein. However, the system described herein is not so limited and, in embodiments, can be used with other types of sensors, such as conventional complementary metal oxide semiconductor (CMOS) image sensors with photodiodes and sensors based on capacitive principles. For example, in a CMOS image sensor, a row could be held in reset (analogous to providing insufficient bias), such that all values would be at the reset value and would not show an image.

Various embodiments of the present technology will now be described. The following description provides specific details for a thorough understanding and an enabling description of these embodiments. One skilled in the art will understand, however, that the system may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the present technology.

Fingerprint Sensor System with Replay Attack Detection Capabilities

FIG. 1 and the following discussion provide a brief, general description of a suitable environment in which a system detecting replay attacks may be implemented. Although not required, aspects of the present technology are described in the general context of computer-executable instructions, such as routines executed by a general-purpose computer, a personal computer, a server, or other computing system. The present technology can also be embodied in a special purpose computer or data processor that is specifically programmed, configured, or constructed to perform one or more of the computer-executable instructions explained in detail herein. Indeed, the term "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programming logic devices (PLDs), microcontrollers, or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

FIG. 1 illustrates an example of an environment in which some implementations of the present technology can be utilized in a system for detecting a replay attack on a biometric system. As illustrated, a replay attack detection system 100 includes a fingerprint sensor 102, a first interface 104, sensor controller 106, a second interface 108, and a fingerprint authenticator 110. In the illustrated system 100, when a finger (not shown) is placed on the fingerprint sensor 102, the sensor controller 106 controls the fingerprint sensor 102 through the first interface 104 in order to conduct a scan of the finger. The sensor controller 106 may, for example, send instructions to control the fingerprint sensor 102 to perform sequential scanning of a scan area formed of pixels. For example, the fingerprint sensor 102 can perform row-by-row or column-by-column sequential scanning. As a further example, the fingerprint sensor 102 can sequentially scan any other shape. As a still further example, the instruction can control the fingerprint sensor 102 to perform the scan non-sequentially (e.g., scanning rows, columns, or any other shape can be scanned in a random order, pseudo-random order, or any other non-sequential order or pattern known to the sensor controller 106).

In a representative example scanning process, the sensor controller 106 generates a command set that causes the fingerprint sensor 102 to: begin by proceeding across a row of pixels capturing pixels values, return to the start of the row after it reaches the end, advance to the next row in the index, begin again, and repeat until every row of pixels has been scanned. While, or after, scanning the pixels forming a row, the fingerprint sensor creates an analog output signal over the first interface 104 directed to the sensor controller 106. In a representative example process, the sensor controller 106 receives the analog signal, performs an analog-to-digital conversion resulting in a digital fingerprint data image of the fingerprint sensor pixels, and sends the fingerprint data image to the fingerprint authenticator 110 through the second interface 108. The second interface 108 can be, for example, implemented as a serial peripheral interface (SPI) bus. The fingerprint authenticator 110 receives the fingerprint data image and compares the fingerprint data image to data on pre-recorded and authorized images to check for a match. If a match is found, for example, the fingerprint authenticator 110 can verify the fingerprint data image as an authorized image. Otherwise, if no match is found, the fingerprint authenticator 110 can report the current user or decline access to a controlled resource.

In some embodiments, the sensor controller 106 includes a scan state machine 112 (SSM) configured to control the fingerprint sensor 102 by initiating the fingerprint sensor startup sequence, perform a scan of the pixels by sequencing through all pixels in the image area, and terminating the scan on completion. The SSM 112 controls which pixels are scanned and in what order they are scanned. In some embodiments, the SSM 112 is a circuit, without firmware that can be compromised by a replay attacker. In other embodiments, the SSM 112 includes one or more computer-readable storage mediums storing computer-executable instructions for controlling the fingerprint sensor 102 and implementing the replay attack detection commands described herein, and one or more processors for executing the computer-executable instructions.

Although FIG. 1 illustrates embodiments in which the fingerprint sensor 102 and sensor controller 106 are discrete components, in some embodiments the fingerprint sensor 102 and sensor controller 106 can be a single unit communicatively coupled with an internal interface (e.g., an internal bus). In some embodiments the fingerprint sensor 102 and sensor controller 106 can be logically combined into a single unit.

In some embodiments, the replay attack detection system 100 includes an analog front-end (AFE) (not shown). The AFE can supply a gain to the analog signals carrying fingerprint data from the fingerprint sensor 102 to the sensor controller 106, and can improve the system's ability to accurately distinguish between ridges and valleys of a fingerprint. In some embodiments, for example, the gain supplied by the AFE provides a step function gain to the detected bias reflected from a fingerprint. In some embodiments, the gain supplied by the AFE amplifies the difference between detected bias at different pixels. In some embodiments, the gain supplied by the AFE both steps up the signals from the detected bias and amplifies the difference between pixels. By improving the system's ability to distinguish ridges and valleys of a fingerprint, the AFE can improve the system's ability to accurately authenticate or deny fingerprints on the fingerprint sensor.

Figure 2:
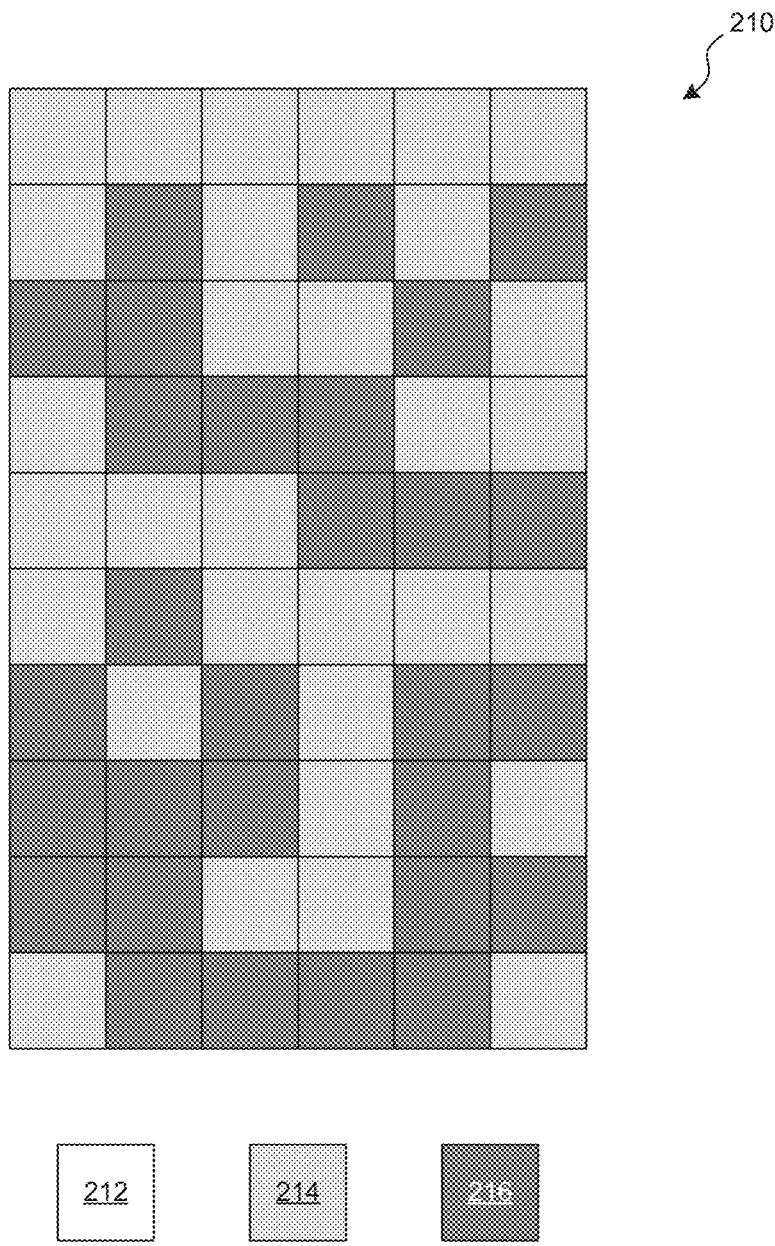
FIG. 2 illustrates an example fingerprint data image captured by the replay attack detection system in accordance with embodiments of the present technology.

FIG. 2 illustrates an example fingerprint data image 210 captured by the replay attack detection system in accordance with embodiments of the present technology. The fingerprint data image 210 may be captured by a fingerprint sensor, such as the fingerprint sensor 102 of FIG. 1. In the illustrated example, the captured fingerprint data comprises ten rows, each of which includes six individual pixels. In the illustration, each individual pixel is represented by a pixel data image 212. Furthermore, each pixel data image 212 represents different degrees of bias detected by a pixel at the corresponding location (e.g. the bias reflected from a fingerprint on the fingerprint sensor to the pixel). For example, in the illustrated example, a light pixel 214 indicates that the bias was reflected at a high rate (corresponding to a ridge in the scanned fingerprint) while a dark pixel 216 indicates that the bias was reflected at a low rate (corresponding to a valley in the scanned fingerprint).

It will be appreciated while FIG. 2 illustrates example captured fingerprint data image 210 comprised of ten rows, each of which includes six pixels, the fingerprint sensor can capture a greater number of pixels. For example, the fingerprint sensor may have an array of 180 rows by 180 columns pixels, 400 rows by 500 columns pixels, or any other pixel array size. Further, while the figure illustrates two bias reflection levels, in embodiments the pixels can transmit analog data with any other number of reflected bias levels, or can transmit analog data with reflected bias on a continuous spectrum.

Returning to FIG. 1, a replay attacker 130 can attempt to intercept the fingerprint data image in between the fingerprint sensor 102 and sensor controller 106 by attacking the first interface 104. In particular, the replay attacker 130 can attempt to intercept the analog data sent from the fingerprint sensor 102 while a live, authorized fingerprint is scanned, record the signals, and replay them (by injecting them into the first interface 104) at a later time. It will be appreciated that in the absence of replay attack detection commands the replay attacker 130 may be able to capture fingerprint data from an authorized user, such as illustrated in FIG. 2, sufficient to mimic the authorized user and gain access to a controlled resource.

Detecting a Replay Attack

As described in detail herein, the system can have built-in replay attack detection capabilities. In order to detect a replay attack, the system can generate a command set that additionally includes one or more replay attack detection commands that cause one or more deviations from the conventional scanning process described above at one or more selected locations. For example, the command set can include deviations in the row indexing of the scan such that, for a selected row, the fingerprint sensor returns to the start of the row and begins again without moving to the next row (e.g. a "carriage return only, no row feed move" in typewriting). As a result, the fingerprint sensor captures repeat scans of rows of pixels (and therefore extra data), resulting in repeated rows present in the analog fingerprint data.

In some embodiments, the replay attack detection commands can also include changes in the bias supplied to a row of pixels, which in turn affects the bias reflected by a fingerprint on the fingerprint sensor. In some embodiments, the replay attack detection commands include decreasing the bias supplied to a row of pixels such that insufficient bias is provided to the sensor to provide a viable response from the row of pixels. By under-biasing the row of pixels, the fingerprint sensor will collect and send fingerprint data that will manifest in a darker row for the under-biased pixels in the fingerprint data. In some embodiments, the replay attack detection commands include increasing the bias supplied to a row of pixels such that too much bias is provided to the sensor to provide a viable response from the row of pixels (e.g. providing excessive bias such that the pixels are overdriven). By over-biasing the row of pixels, the fingerprint sensor will collect and send fingerprint data that will manifest in a saturated, lighter row for the over-biased pixels in the fingerprint data. For example, in embodiments in which the fingerprint sensor is an active thermal sensor, the sensor may typically be driven by a bias of approximately 80 milliamperes (mA). In some embodiments, the bias current supplied when under-biasing the fingerprint sensor can be decreased by approximately 5 mA to 40 mA from the unadjusted typical bias. In some embodiments, the bias current supplied when over-biasing the fingerprint sensor can be increased by approximately 5 mA to 40 mA from the unadjusted typical bias.

In some embodiments, the replay attack detection commands can also include changes in the scan time for a row of pixels. That is, the time each pixel in a row is exposed to reflected bias to capture a signal can be adjusted (e.g., decreased or increased relative to a typical scan time). Decreasing pixel scan time can result in a darker pixel in the fingerprint data, while increasing pixel scan time can result in a lighter pixel. For example, in some embodiments each pixel of a fingerprint sensor can have a typical scan time of approximately 10 microseconds, and the pixel scan time of one or more pixels can be adjusted to increase or decrease by 2 to 6 microseconds from the typical scan time.

In some embodiments, the replay attack detection commands can also include changes in the gain supplied by the AFE for a row of pixels. For example, the overall gain supplied can be decreased, manifesting in darker pixels in the fingerprint data. As further example, the overall gain supplied can be increased, manifesting in lighter pixels in the fingerprint data.

In some embodiments, the replay attack detection commands can include a combination of the deviations discussed above. For example, a replay attack detection command can cause the fingerprint sensor to repeat a scan of a specified row while also under-biasing the pixels in the specified row, resulting in both a darker row and additional data in the fingerprint data. As a further example, a replay attack detection command can cause the fingerprint sensor to repeat a scan of a specified row while over-biasing, reducing the pixel scan time, and decreasing the gain supplied by an AFE (e.g., potentially resulting in a darker row despite the over-supply of bias). As a still further example, replay attack detection commands can includes a combination of deviations applied to different patterns or shapes. That is, for example, the scan of a specified row may be repeated, while the scan of a portion of a column is under-biased, while the scan of a pseudo-random selection of non-contiguous pixels is given a longer scan time. In some embodiments, the various deviations (e.g., the bias supply, pixel scan time, and gain supplied by an AFE) can be varied together such that the fingerprint data received from the row is roughly equivalent to the fingerprint data that would be generated with no changes in parameters for the scan. In such embodiments, the sensor controller can include balanced replay attack detection commands to receive usable fingerprint data from rows that were scanned with replay attack detection commands. The inclusion of balanced replay attack detection commands can make it harder to decrypt the replay attack detection commands, thereby increasing the security of the system.

It will be appreciated that while the examples of replay attack detection commands given above are applied to the indexing and parameters for a scan of a row of pixels, the replay attack detection commands can cause a deviation in the indexing and parameters for a scan of only a single pixel or various other shapes of pixels.

In some embodiments, the shape of pixels selected for each of potentially multiple replay attack detection commands is the same for each of the commands. That is, for example, a first replay attack detection command can cause the fingerprint sensor to repeat the scan of the second row of pixels in a fingerprint sensor and a second replay attack detection command can cause the fingerprint sensor to repeat the scan of the second row while over-biasing the pixels in the second row. In some embodiments, the shape of pixels selected can vary from one replay attack detection command to the next. For example, a first replay attack detection command can cause the fingerprint sensor to repeat the scan of a portion of the fifth column of pixels in a fingerprint sensor, a second replay attack detection command can cause the fingerprint sensor to repeat the scan of a portion of the fourth row while over-biasing a portion of the pixels in the fourth row, and a third replay attack detection command can cause the fingerprint sensor to over-bias a portion of the pixels in the first row and under-bias a portion of pixels in the seventh column.

In some embodiments, different replay attack detection commands can select overlapping shapes of pixels. For example, a first replay attack detection command can cause the fingerprint sensor to repeat the scan of a first half of the fourth column of pixels in a fingerprint sensor and a second replay attack detection command can cause the fingerprint sensor to repeat the scan of the entire fourth column while over-biasing the pixels in the fourth column. In some embodiments, the shape of pixels selected for a first replay attack detection command will have no overlap with the shape of pixels selected for a second replay attack detection command. For example, a first replay attack detection command can cause the fingerprint sensor to repeat the scan of a second third of the eighth row of pixels and a second replay attack detection command can cause the fingerprint sensor to repeat the scan of the third row while over-biasing the pixels in the third row. In some embodiments, the shape of pixels selected for some subset of the replay attack detection commands can overlap while the shape of pixels selected for the remaining replay attack detection commands does not overlap.

In some embodiments, the system can randomly generate the one or more replay attack detection commands at the start of each scan (e.g. using hardware random-number generation, pseudo-random number generators, pseudo-random binary sequence, etc.). In some embodiments, the system generates a random number of replay detection commands, in a random combination and indexing order, affecting a random number of pixels. For example, a first set of commands can include instructions to repeat the scan of a first row twice and to over-bias a second row, while the next scan can include instructions to repeat the scan of a third row one time, repeat the scan of a seventh row three times, repeat the scan of a ninth row once, and also under-bias the first row. In other embodiments, system can randomly select from a number of pre-defined command sets that include one or more replay attack detection commands. For example, the system can randomly choose between ten command sets containing one or more replay attack detection commands.

In some embodiments, the replay attack detection commands are specified in advance of any fingerprint scan and known a priori by the fingerprint sensor and the sensor controller. For example, the replay attack detection commands can be specified at manufacture, during a system configuration, etc. The specified replay attack detection commands can, for example, be stored to a storage area (such as firmware or other memory storage) resident to the system. In some embodiments the fingerprint sensor performs scanning based on stored replay attack detection commands instead of receiving commands over an interface, and the sensor controller evaluates the received fingerprint data based on stored replay attack detection commands. The stored replay attack detection commands used by the fingerprint sensor and the sensor controller can be stored in the same storage area shared by both, or in different storage areas. In some embodiments, the system can cycle through two or more replay attack detection command sets in a manner known to the system, allowing different replay attack detection data to be generated between two scans without the replay attack detection commands being communicated between the fingerprint sensor and sensor controller.

Figure 3:
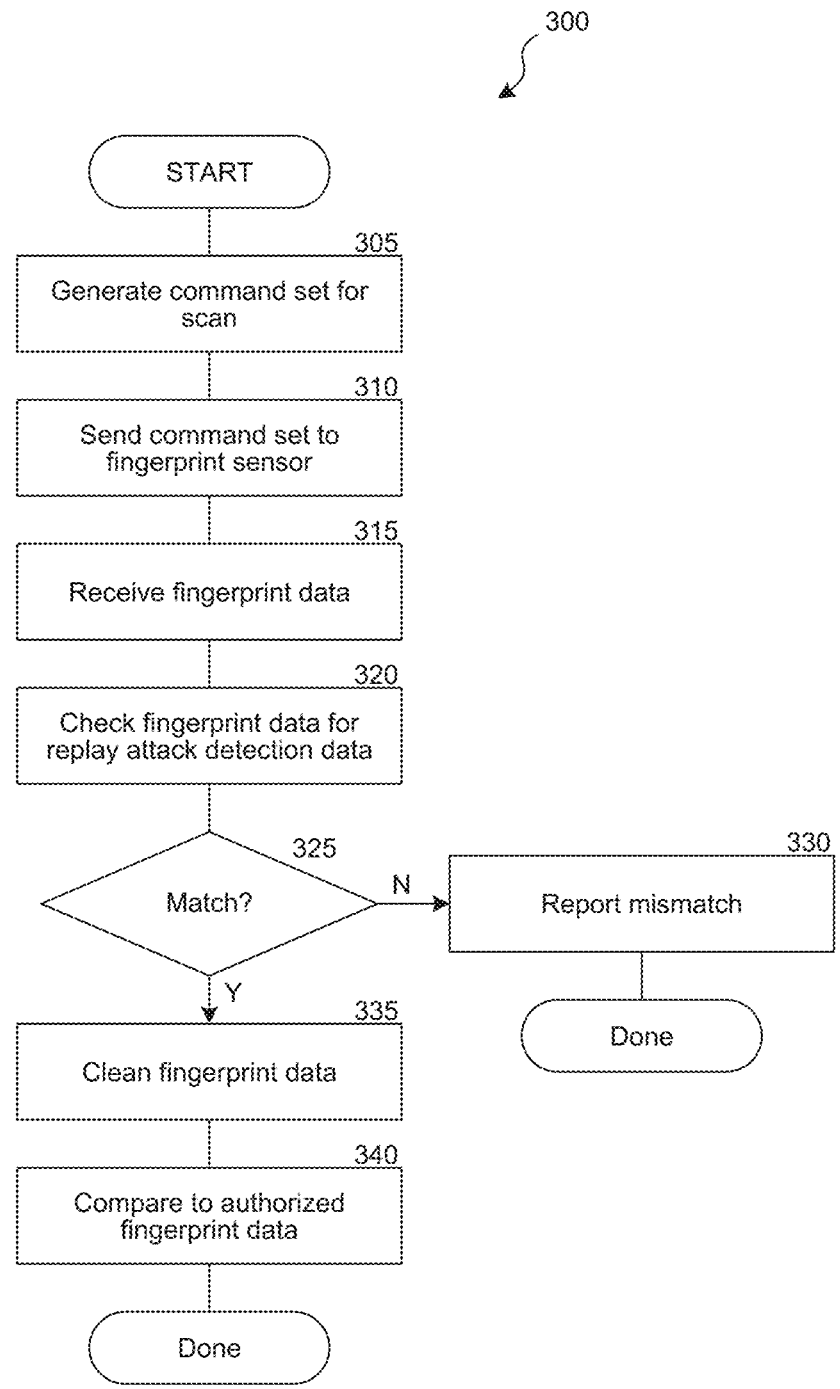
FIG. 3 is a flow diagram of a process, implemented by the replay attack detection system, for detecting a replay attack in accordance with embodiments of the present technology.

FIG. 3 is a flow diagram of a process 300, implemented by the replay attack detection system, for detecting a replay attack in accordance with embodiments of the present technology.

The process begins at a block 305, where the system generates a command set for a fingerprint sensor. The process may begin, for example, in response to detecting the presence of a finger on the fingerprint sensor. In order to detect a replay attack, the command set generated includes one or more replay attack detection commands. For example, the command set may include a command to repeat the scan of a specified row multiple times, to under-bias a different specified row, or any combination.

At a block 310 the system sends the command set to the fingerprint sensor. The fingerprint sensor receives the command set and executes a scan of the fingerprint sensor area pixels accordingly. It will be appreciated that the fingerprint sensor can send the entire scan results at once after completing the scan, or send the scan results row by row, pixel by pixel, or in any other cluster concurrently with the scan.

At a block 315, the system receives fingerprint data from the fingerprint sensor corresponding to the scan results. It will be appreciated that at this step, fingerprint sensor data could be susceptible to capture by an attacker. However, because it would be unknown to an attacker which commands are associated with detecting a replay attack and which for capturing unmodified fingerprint data (i.e., for generating a match), a replay attacker will not be able to successfully make use of any captured data (which includes replay attack detection data).

At function block 320, the system checks the fingerprint data for the replay attack detection data associated with the replay attack detection commands. The operation of function block 320 is described in more detail in FIG. 4.

At decision block 325, the system evaluates whether the received fingerprint data contains replay attack detection data corresponding to the replay attack detection commands. If the received fingerprint data does not contain the expected replay attack detection data, which is indicative of a replay attack, processing continues to a block 330. If, however, the expected replay attack detection data is found in the received fingerprint data, which suggests the fingerprint data was captured live (i.e., no replay attack), processing continues to a block 335.

At the block 330, the system reports the mismatch. Reporting the mismatch can include, for example, generating an indication of a detected replay attack that is transmitted to a fingerprint authenticator. In some embodiments, reporting the mismatch results in the system denying the access attempt. In some embodiments, reporting the mismatch further includes the system temporarily disabling access to the controlled resource altogether.

At a block 335, the system processes the analog fingerprint data to create the scan image. Processing the analog fingerprint data can include converting the data into digital fingerprint data or removing replay attack detection data. If the fingerprint data was captured from a real-time scan, the processing results in a normal digital fingerprint data image (such as the fingerprint data image 210 in FIG. 2) which may match an authorized fingerprint data image stored in the system. If, however, a replay attack is occurring, the processing will likely remove data from the scan image that was not replay attack detection data, resulting in a distorted fingerprint data image that likely will not match any authorized image later in the process.

At a block 340, the system compares the processed fingerprint data image to authorized fingerprint data images. The system can then grant or deny access to a controlled resource depending on the result of the comparison between the processed fingerprint data image and fingerprint data of known authorized (i.e., enrolled) users.

Figure 4:
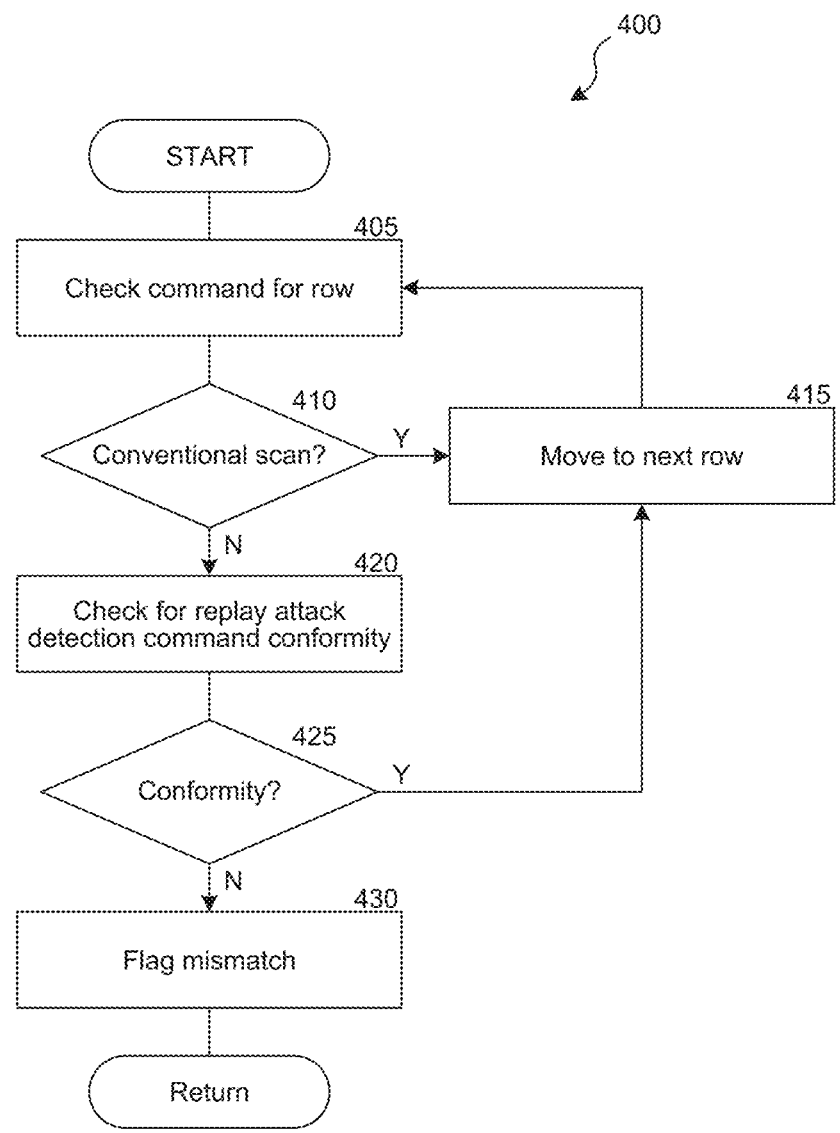
FIG. 4 is a flow diagram of a process, implemented by the replay attack detection system, for evaluating biometric information for indications of a replay attack in accordance with embodiments of the present technology.

FIG. 4 illustrates a process 400, implemented by the replay attack detection system, for evaluating whether fingerprint data includes expected replay attack detection data. As described above, the process 400 may be initiated as part of a process to detect whether there is a replay attack occurring (such as process 300 illustrated in FIG. 3).

The process begins at a block 405, where the system checks the command given for a sample row in the scan.

At decision block 410, the system checks whether the command given for the sample row included a command to detect a replay attack, or whether the command did not include a replay attack detection command. If there was no replay attack detection command for the given row (otherwise referred to herein as a "conventional scan" of the row), the process continues to a block 415. Otherwise, the command was a replay attack detection command and processing continues to a block 420.

At a block 415, the system moves to the next sample row without evaluating the current row. No evaluation of the current row is required, for example, since the row should not include any replay attack detection data (i.e., it should include conventional fingerprint data) and therefore is not necessary for evaluating the existence of a replay attack. Processing then returns to block 405 to evaluate the next row. Although not shown, if the current row is the last row of the sensor area, the process 400 exits instead of returning to the block 405.

At a block 420, the system checks for replay attack detection data in conformity with the replay attack detection command. For example, if the replay attack detection command was to under-bias the sample row during the scan, the system checks for a corresponding darker row. If the command was to repeat the scan of the previous row, the system checks the sample row for substantial conformity with the previous sample row (e.g. checks that the values received at individual pixels in the row are substantially equivalent between the sample row and the previous row).

In some embodiments, the check for a repeated sample row tolerates a maximum of a 10 percent difference in pixel values between the sample row and the previous row. In other embodiments, the check for a repeated sample row tolerates a maximum of a 5 percent difference in pixel values between the sample row and the previous row. In still other embodiments, the check for a repeated sample row tolerates a maximum of a 1 percent difference in pixel values between the sample row and the previous row. In embodiments where the replay attack detection command was to repeat the scan of a row while changing the bias supplied to the row, the system may only check for a corresponding darker or lighter row.

At a decision block 425, the system evaluates whether the fingerprint data for the checked row conforms to an expected value based on the replay attack detection command for that row. If the system determines that the fingerprint data for that row does not conform with the replay attack detection command, processing continues to a block 430. Otherwise, if the system determines that the fingerprint data for that row conforms to the replay attack detection command, processing continues to block 415 where, as described above, evaluation of a next row begins if the sensor data includes remaining rows.

At the block 430, the system flags the mismatch due to the nonconformity of fingerprint data. The flag from block 430 can be used, for example, in the decision block 325 of process 300 (illustrated in FIG. 3).

FIG. 5 illustrates an example table 500 of replay attack detection commands for controlling a fingerprint sensor in a replay attack detection system, in accordance with embodiments of the present technology. The illustrated table 500 includes, for example, a sample number 520 corresponding to the order in which the fingerprint sensor will follow the commands. For example, the first action the fingerprint sensor will take will follow the commands in sample index 1, the second will follow the commands in sample index 2, and so on. Each sample number 520 can correspond to a command for a row. That is, sample index 1 can correspond to a first row's command, sample index 2 can correspond to a second row's command, etc. Although illustrated in human-readable form, the system can maintain the data in other computer-readable formats.

The table 500 also includes sample commands 530, which cause the fingerprint sensor to scan the pixels in a sample index according to the command given. Command 532 is a conventional scanning command. For example, command 532 can cause the fingerprint sensor to proceed across a row of pixels, capturing pixel values using ordinary bias value, and return to the start of the next row after the end of the row is reached. Command 534 is an example replay attack detection command that causes the fingerprint sensor to repeat the scan of the previous row of pixels while providing insufficient bias to the pixels. As described above, this will cause excess data in the fingerprint data, where the excess data for the sample index 2 will be a darker row due to the under-biased pixels. Command 536 is an example replay attack detection command that causes the fingerprint sensor to repeat the scan of the previous row of pixels. As described above, this will cause excess data in the fingerprint data, where the excess data for sample index 4 should substantially match the row data for sample index 3 (which, as illustrated, is a conventional scan). Command 538 is an example replay attack detection command that causes the fingerprint sensor to repeat the scan of the previous row of pixels while providing an excessive bias to the pixels. As described above, this will cause excess data in the fingerprint data, where the excess row data for the sample index 11 will also be a lighter row due to the over-biased scan. It will be appreciated that the use of conventional commands to capture fingerprint data, combined with the replay attack detection commands, results in the generation of fingerprint data with additional data, or excess data, that facilitates the detection of whether fingerprint data was captured in response to the combined set of commands (e.g., the excess data acts as replay attack detection data).

Figure 6:
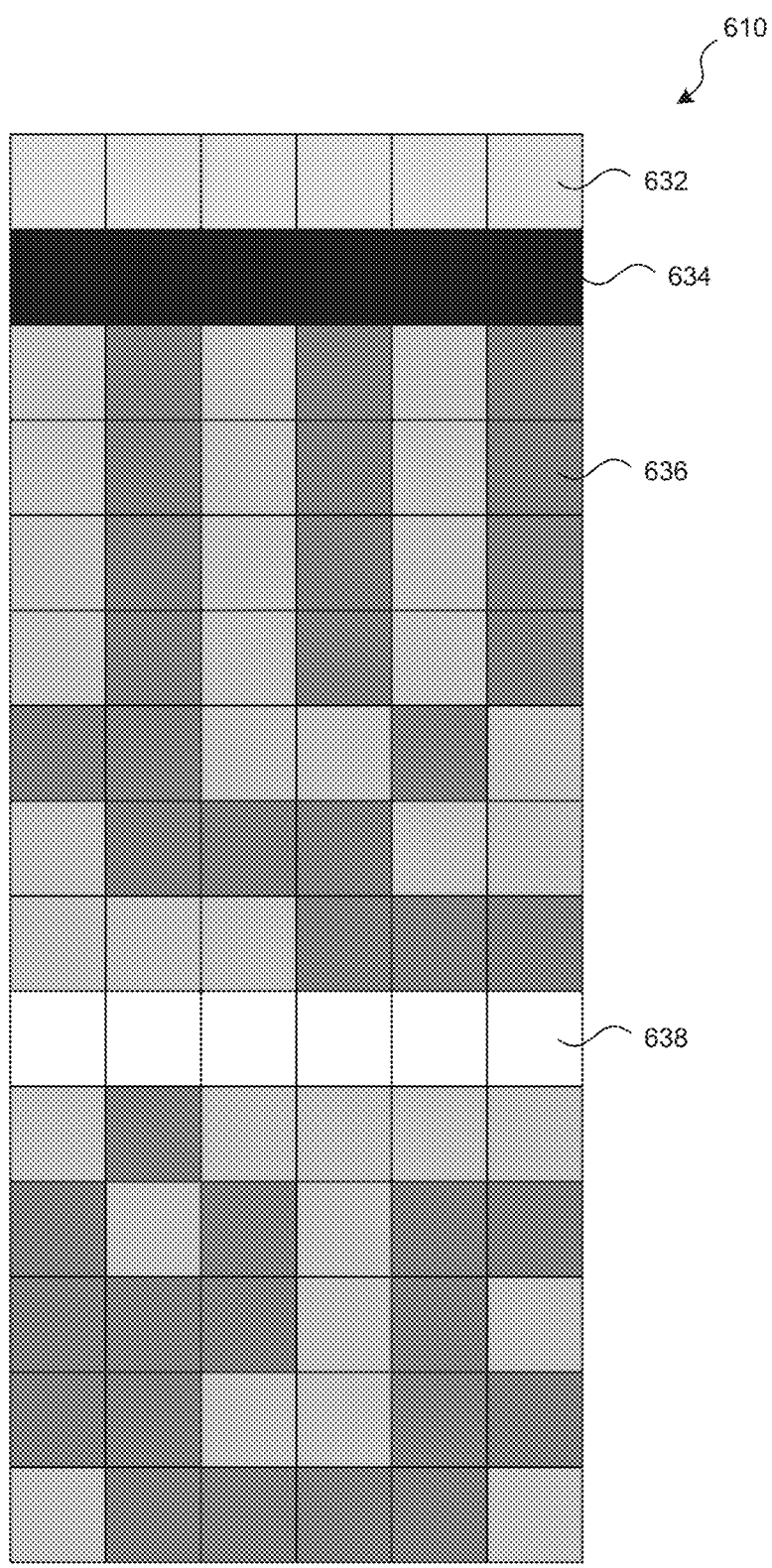
FIG. 6 illustrates an example fingerprint data image, captured by the replay attack detection system in response to example replay attack detection commands in accordance with embodiments of the present technology.

FIG. 6 illustrates example fingerprint data image 610, captured by the replay attack detection system in accordance with embodiments of the present technology, in response to example replay attack detection commands illustrated in FIG. 5. In the example fingerprint data image 610, the first row corresponds to sample index number 1, the second row corresponds to sample index number 2, and so on. According to command 532 of FIG. 5, a normal row 632 is present in the first row of the fingerprint data image 610. According to command 534, a darker row 634 of replay attack detection data is present in the second row of the fingerprint data image 610. According to command 536, a repeated row 636 of replay attack detection data is present in the fourth row of the fingerprint data image 610. As illustrated, the repeated row 636 is substantially identical to the preceding row in the third row of the fingerprint data image 610. According to command 538, a lighter row 638 of replay attack detection data is present in the eleventh row of the fingerprint data image 610.

FIG. 7 illustrates an example table 700 of replay detection markers. The system can use the table 700 of replay detection markers to, for example, evaluate whether fingerprint data has replay attack detection data that is consistent with replay attack detection commands. That is, for example, whereas the table 500 in FIG. 5 illustrates both conventional commands and replay attack detection commands that can be used by a fingerprint sensor to capture fingerprint data, the illustrated table 700 can be limited to include only the data relevant to replay attack detection.

In the illustrated table 700, the table includes only the sample indices 710 corresponding to replay attack detection commands. That is, no indices corresponding to conventional commands are represented, and therefore no checks of those indices need be performed to evaluate the presence of a replay detection attack. The table 700 also includes check-sample instructions 740 that the system will follow to check the fingerprint data image 610 to evaluate for replay attack detection data. As illustrated, at sample index 2, the system will implement a check 744 to check for a darker row in row 2 of the fingerprint data image 610. At sample indexes 4-6, the system will implement a check 746 to check for repeated row in rows 4-6 of the fingerprint data image 610. At sample index 11, the system will implement a check 748 to check for a lighter row in row 11 of the fingerprint data image 610. If the expected replay attack detection data is not present in the fingerprint data image 610 corresponding to any of the checks 744, 746, 748, the system can detect the indication of a likely replay attack. It will be appreciated that while table 700 has been described in the context of evaluating fingerprint data characterized as rows of pixels, the system may perform evaluations using other forms of fingerprint data. For example, example table 700 may be used to evaluate analog fingerprint data for replay attack detection data. As a further example, example table 700 can be used to evaluate digital characterizations of fingerprint data.

Figure 8A:
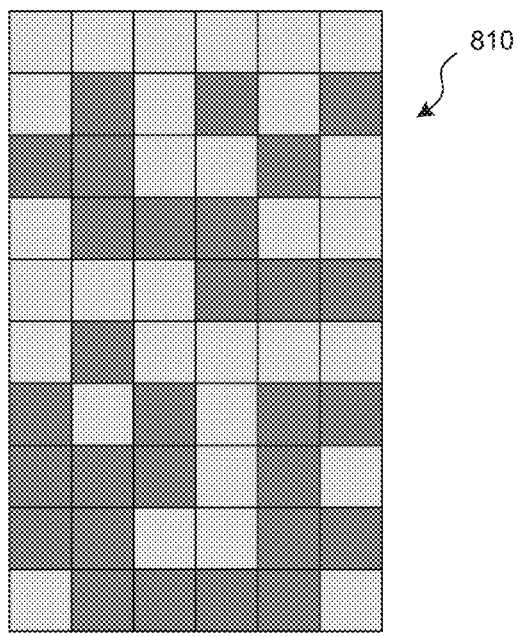
FIG. 8A illustrates an example fingerprint data image that was previously captured by a replay attacker being submitted as a replay attack.
Figure 8B:
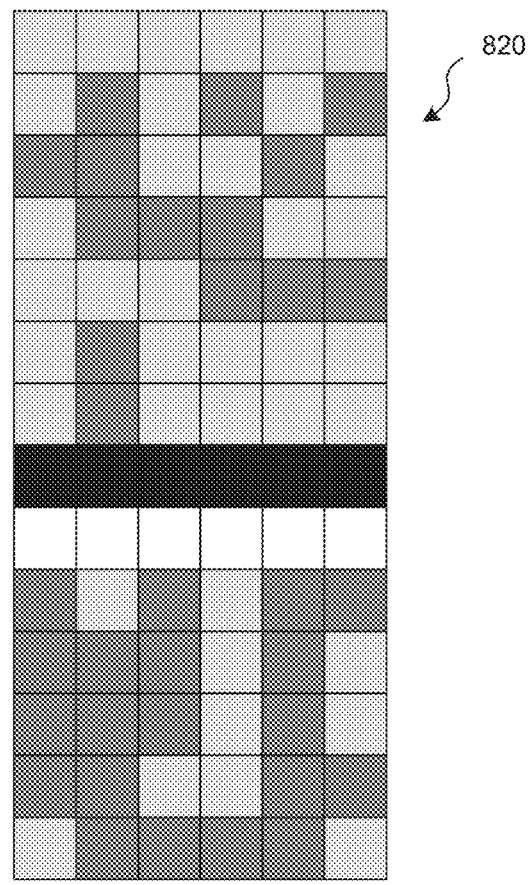
FIG. 8B illustrates an example fingerprint data image that was previously captured by a replay attacker being submitted as a replay attack.

In some embodiments, the replay attack detection system looks for the presence of replay attack detection data (e.g., repeated rows, over-biased or under-biased rows, and/or any combinations) to determine whether a fingerprint has been captured live or is indicative of a replay attack. FIGS. 8A and 8B, described below, illustrate examples of when fingerprint data does not include the replay attack detection data expected by the system.

FIG. 8A illustrates an example fingerprint data image 810 that was previously captured by a replay attacker being submitted as a replay attack. For example, the replay fingerprint data image 810 may have been captured from a sensor generating fingerprint data that does not include any replay attack detection data. In the illustrated replay fingerprint data image 810, none of the replay attack detection data discussed above is present. Accordingly, for example, should the system check for a darker row in row 2 of the replay fingerprint data image 810, in accordance with the evaluation required in accordance with example table 700, there will not be a match. The mismatch will be flagged, and the replay attack detection system will successfully detect the replay attack.

FIG. 8B illustrates a further example fingerprint data image 820 that was previously captured by a replay attacker being submitted as a replay attack. For example, the illustrated replay fingerprint data image 820 may have been captured from a sensor generating fingerprint data based on a prior set of replay attack detection commands. As illustrated in the fingerprint data image 820, the previous replay attack detection commands were a repeat scan of row 6 at sample index 7, a scan with insufficient bias at sample index 8, and a scan with excessive bias at sample index 9. These commands do not match the commands generated for example table 500. Accordingly, for example, if the system should check for a darker row in row 2 of the replay fingerprint data image 820, in accordance with the evaluation required in accordance with example table 700, there will not be a match. The mismatch will be flagged, and the replay attack detection system will successfully detect the replay attack.

Figure 9:
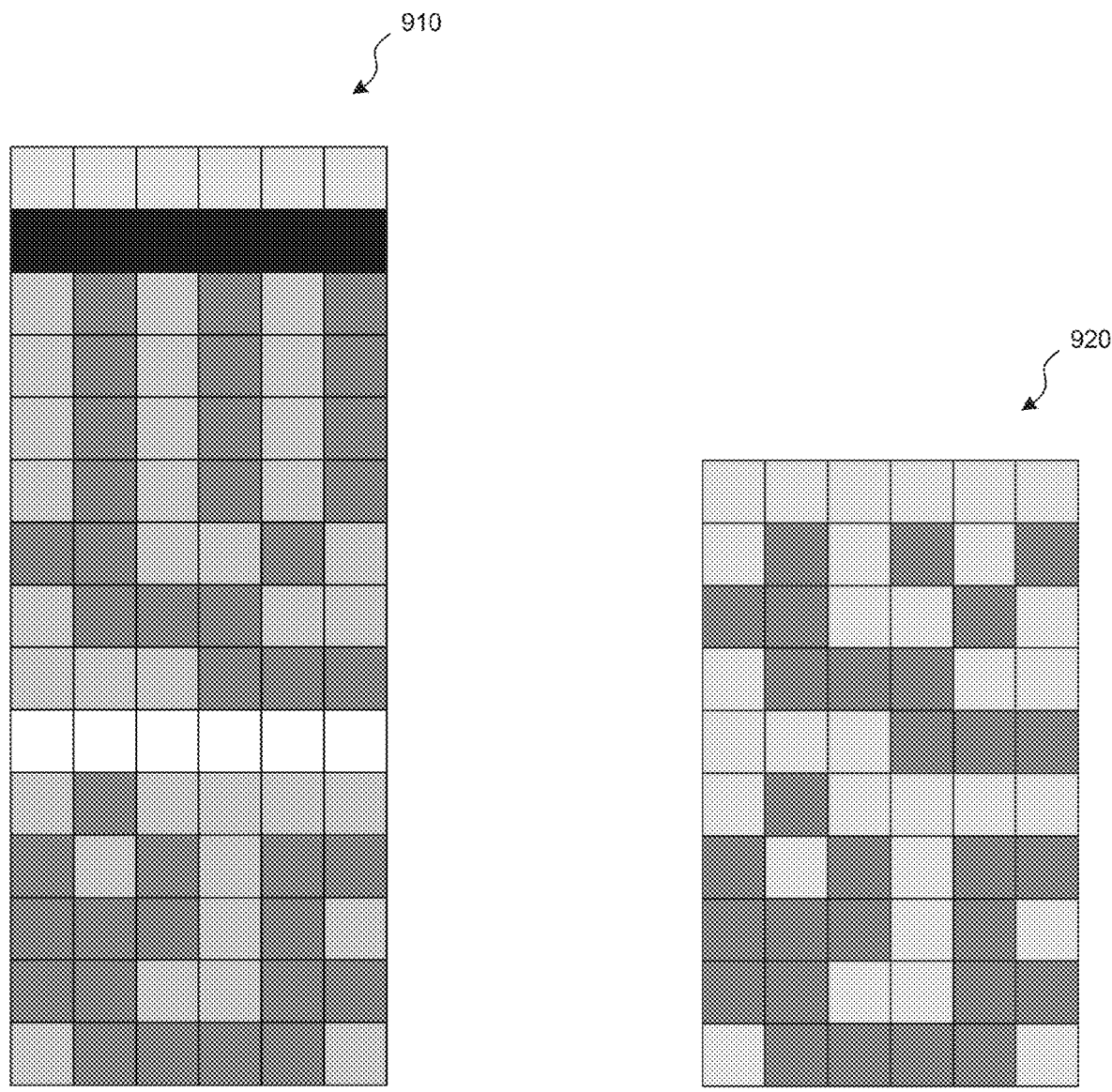
FIG. 9 illustrates the example fingerprint data image of FIG. 6 before and after being processed by the system to remove replay attack detection data.
Figure 10A:
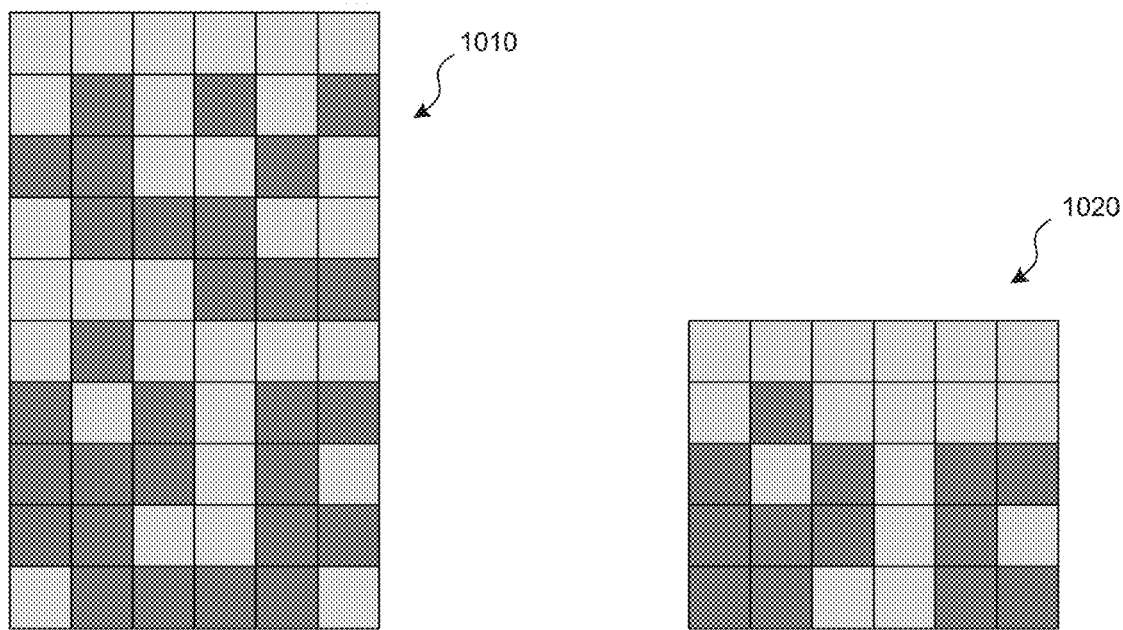
FIG. 10A illustrates the example fingerprint data image of FIG. 8A before and after being processed by the system to remove replay attack detection data.
Figure 10B:
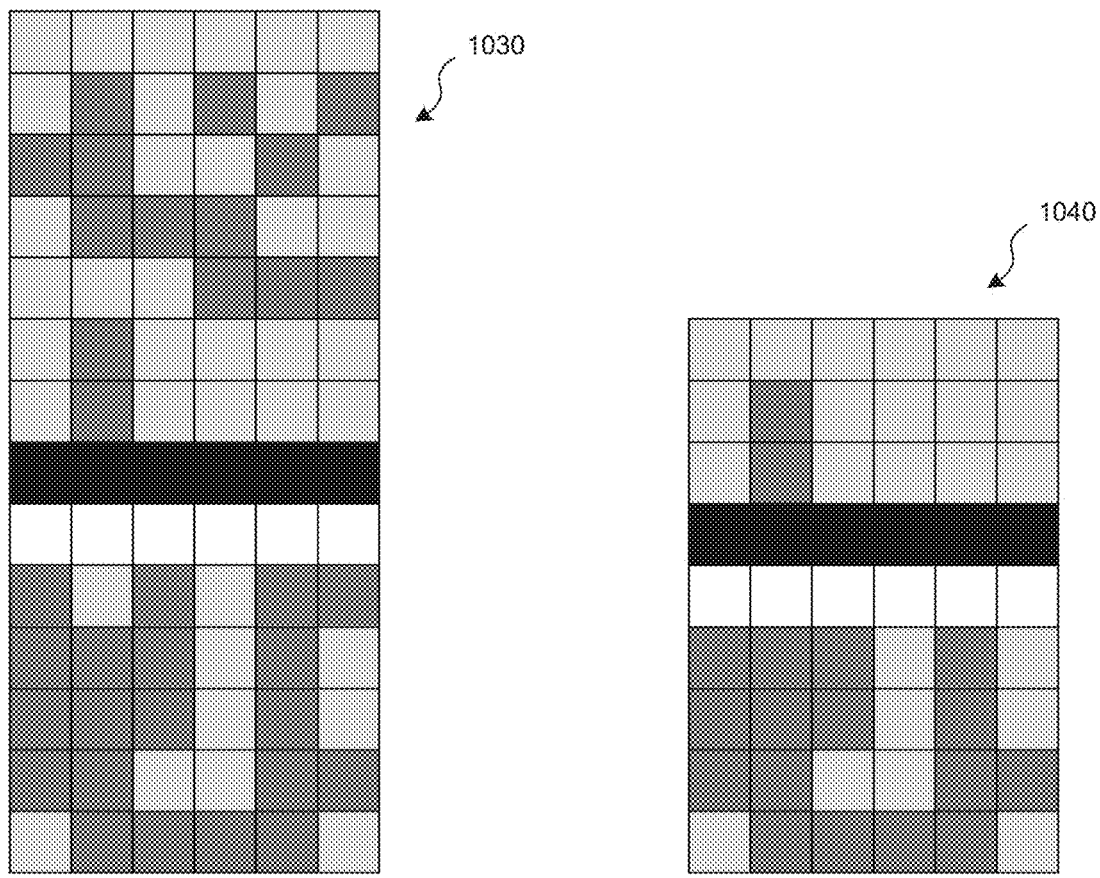
FIG. 10B illustrates the example fingerprint data of FIG. 8B before and after being processed by the system to remove replay attack detection data.

In some embodiments, the replay attack detection system identifies replay attacks by processing received fingerprint data to remove data where the system expects replay attack detection data (based on the generated replay attack detection commands), and then evaluates whether the processed fingerprint data matches the fingerprint data of an authorized user. In these embodiments, since any fingerprint data submitted by a replay attacker would not have the expected replay attack detection data, removing data within replay attacker's fingerprint data would distort the resulting fingerprint data image. In turn, the distortion is likely to result in no match being determined during the authentication step. The replay attack is therefore avoided. FIGS. 9, 10A, and 10B, described below, illustrate examples of processing fingerprint data from an attacker to remove data expected to correspond to replay attack detection data and the resulting mismatches.

FIG. 9 illustrates example fingerprint data image before and after being processed by the system to remove replay attack detection data. As illustrated, fingerprint data image 910 contains replay attack detection data that was captured according to the replay attack detection commands illustrated in table 500. As the system removes data from the fingerprint data image 910 where it expects excess replay attack detection data, it will produce fingerprint data image 920. It will be appreciated that if, for example, the fingerprint data image 910 was captured according to commands illustrated in table 500 of FIG. 5, then processing the fingerprint data image to remove the replay attack detection data (e.g., removing rows 2-6 and row 11) results in fingerprint data image 920 that matches the fingerprint data image 210 from FIG. 2.

FIG. 10A illustrates an example of processing fingerprint data to remove replay attack detection data, for example in response to known replay attack detection commands, when the fingerprint data does not include replay attack detection data. As illustrated in FIG. 10A, replay fingerprint data image 1010 does not contain replay attack detection data. Accordingly, if the system processes the fingerprint data image 1010 based on replay attack detection commands illustrated in table 500 (e.g., removing rows 2-6 and row 11 to remove replay attack detection data), the system will produce fingerprint data image 1020, a distorted version of fingerprint data image 210 from FIG. 2. Because fingerprint data image 1020 is missing data, it will not match an authorized image matching fingerprint data image 210 and will be unlikely to match any authorized image.

FIG. 10B illustrates an example of processing fingerprint data to remove replay attack detection data, for example in response to known replay attack detection commands, when the fingerprint data includes replay attack detection data that is inconsistent with those replay attack detection commands. As illustrated in FIG. 10B, replay fingerprint image 1030 includes various replay attack detection data. Accordingly, if the system processes the fingerprint data image 1030 based on replay attack detection commands illustrated in table 500 (e.g., removing rows 2-6 and row 11 to remove replay attack detection data), the system will produce fingerprint data image 1040, a distorted version of fingerprint data image 210 that still contains rows corresponding to various replay attack detection commands. Fingerprint data image 1040 will not match an authorized image matching fingerprint data image 210 and will be unlikely to match any authorized image.

Thus, even if the system does not implement an explicit check for replay attacks, the fingerprint authenticator will not authorize the replay attacker's fingerprint data images because they will not match an authorized image after they have been processed.

EXAMPLES

Various examples of aspects of the subject technology described above with reference to FIGS. 1-10B are provided as numbered clauses (1, 2, 3, etc.) for convenience. These are provided as examples and do not limit the subject technology.

1. A method for detecting replay attacks in a fingerprint sensor system, the method comprising:
generating a command set, the command set causing a fingerprint sensor to conduct a scan of rows of pixels to capture fingerprint data, wherein the command set includes a replay attack detection command,
wherein the replay attack detection command causes the fingerprint sensor to repeat the scan of a set of pixels in a selected row to capture replay attack detection data; and
sending the command set to the fingerprint sensor;
receiving the fingerprint data from the fingerprint sensor, the fingerprint data comprising the replay attack detection data;
evaluating the fingerprint data for the presence of the replay attack detection data in conformity with the replay attack detection command; and
identifying a replay attack of the fingerprint sensor system based on the evaluation of the fingerprint data.

2. The method of clause 1, further comprising denying access to a resource protected by the fingerprint sensor system based on the identification of a replay attack.

3. The method of clauses 1-2, wherein the set of pixels in the selected row is pseudo-randomly selected.

4. The method of clauses 1-3, wherein evaluating the fingerprint data for the presence of the replay attack detection data comprises comparing the set of pixels in the selected row to a previous scan of the selected row.

5. The method of clauses 1-4, wherein the replay attack detection command further causes the fingerprint sensor to change a bias supplied to the set of pixels in the selected row of pixels during the repeated scan.

6. The method of clauses 1-5, wherein the command set includes a second replay attack detection command, and wherein the second replay attack detection command is selected from a set of replay attack detection commands comprising:
a repeat replay attack detection command causing the fingerprint sensor to repeat the scan of a second set of pixels in a second selected row without changing a bias supplied to the row of pixels;
an under-bias replay attack detection command causing the fingerprint sensor to decrease a bias supplied to the second set of pixels in the second selected row to an insufficient level;
an over-bias replay attack detection command causing the fingerprint sensor to increase a bias supplied to the second set of pixels in the second selected row to an excessive level;
a pixel scan time adjustment replay attack detection command causing the fingerprint sensor to adjust the pixel scan time for the scan of the second set of pixels in the second selected row; and a gain change replay attack detection command causing the fingerprint sensor to change a gain supplied to a detected bias at the second set of pixels in the second selected row.

7. A biometric system comprising:
a fingerprint sensor; and
a sensor controller in communication with the fingerprint sensor through an interface, wherein the sensor controller is configured to:
generate a command set, the command set configured to cause the fingerprint sensor to conduct a scan of columns of pixels to capture fingerprint data, wherein the command set includes a replay attack detection command,
wherein the replay attack detection command causes the fingerprint sensor to repeat the scan of a set of pixels in a selected column to capture replay attack detection data;
send the command set to the fingerprint sensor through the interface;
receive the fingerprint data from the fingerprint sensor through the interface; and
evaluate the fingerprint data for the presence of the replay attack detection data in conformity with the replay attack detection command.

8. The biometric system of clause 7, wherein the sensor controller is further configured to process the fingerprint data to remove, based on the replay attack detection command, the replay attack detection data from the fingerprint data.

9. The biometric system of clauses 7-8, wherein the sensor controller is further configured to randomly select the set of pixels in the selected column.

10. The biometric system of clauses 7-9, wherein the sensor controller is an application-specific integrated circuit.

11. The biometric system of clauses 7-10, wherein the sensor controller includes:
one or more computer-readable storage mediums storing computer-executable instructions for controlling the sensor controller; and
one or more processors for executing the computer-executable instructions stored in the one or more computer-readable storage mediums.

12. The biometric system of clauses 7-11, wherein:
the sensor controller includes a scan state machine in communication with the fingerprint sensor, wherein the scan state machine is configured to control the fingerprint sensor to:
initiate a fingerprint sensor start-up sequence; and
perform a scan of pixels in the fingerprint sensor by capturing data from the columns of pixels in the fingerprint sensor in an order directed by the command set.

13. A method for detecting replay attacks in a fingerprint sensor system, the method comprising:
generating a command set, the command set causing a fingerprint sensor to scan a plurality of pixels to capture fingerprint data, wherein the command set includes one or more replay attack detection commands each causing the fingerprint sensor to capture replay attack detection data from a shape of pixels selected from the plurality of pixels;
sending the command set to the fingerprint sensor; and
receiving fingerprint data from the fingerprint sensor.

14. The method of clause 13, further comprising:
processing the fingerprint data to remove data received from the shape of pixels to produce a fingerprint data image;
comparing the fingerprint data image to stored authorized fingerprint data images to check for a match between the fingerprint data image and an authorized fingerprint data image; and
denying access to a resource protected by the fingerprint sensor system if the fingerprint data image does not match any authorized fingerprint data images.

15. The method of clauses 13-14, wherein the shape of pixels is randomly generated.

16. The method of clauses 13-15, wherein the shape of pixels comprises a single pixel from the plurality of pixels.

17. The method of clauses 13-16, wherein at least one of the one or more replay attack detection commands causes the fingerprint sensor to adjust a pixel scan time for the shape of pixels.

18. The method of clauses 13-17, wherein at least one of the one or more replay attack detection commands causes the fingerprint sensor to change a gain supplied to a detected bias at the shape of pixels.

19. The method of clauses 13-18, wherein the command set includes a first replay attack detection command associated with a first shape of pixels and a second replay attack detection command associated with a second shape of pixels.

20. The method of clauses 13-19, wherein at least one pixel from the plurality of pixels is in the first shape of pixels and the second shape of pixels.

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order above, alternative embodiments may perform steps in a different order. Furthermore, the various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. To the extent any material incorporated herein by reference conflicts with the present disclosure, the present disclosure controls. Where the context permits, singular or plural terms may also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded.

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular embodiments may also be combined or eliminated in other embodiments. Furthermore, although advantages associated with certain embodiments of the technology have been described in the context of those embodiments, other embodiments may also exhibit such advantages, and not all embodiments need necessarily exhibit such advantages to fall within the scope of the technology. Accordingly, the

We claim:

1. A method for detecting replay attacks in a fingerprint sensor system, the method comprising:
generating a command set, the command set causing a fingerprint sensor to conduct a scan of rows of pixels to capture fingerprint data, wherein the command set includes a replay attack detection command,
wherein the replay attack detection command causes the fingerprint sensor to repeat the scan of a set of pixels in a selected row to capture replay attack detection data; and
sending the command set to the fingerprint sensor;
receiving the fingerprint data from the fingerprint sensor, the fingerprint data comprising the replay attack detection data;
evaluating the fingerprint data for the presence of the replay attack detection data in conformity with the replay attack detection command; and
identifying a replay attack of the fingerprint sensor system based on the evaluation of the fingerprint data,
wherein the replay attack detection command is selected from the set of replay attack detection commands comprising:
a repeat replay attack detection command causing the fingerprint sensor to repeat the scan of the set of pixels in the selected row without changing a bias supplied to the set of pixels;
an under-bias replay attack detection command causing the fingerprint sensor to decrease a bias supplied to the set of pixels in the selected row to an insufficient level;
an over-bias replay attack detection command causing the fingerprint sensor to increase a bias supplied to the set of pixels in the selected row to an excessive level;
a pixel scan time adjustment replay attack detection command causing the fingerprint sensor to adjust the pixel scan time for the scan of the set of pixels in the selected row; and
a gain change replay attack detection command causing the fingerprint sensor to change a gain supplied to a detected bias at the set of pixels in the selected row.

2. The method of claim 1, further comprising denying access to a resource protected by the fingerprint sensor system based on the identification of a replay attack.

3. The method of claim 1, wherein the set of pixels in the selected row is pseudo-randomly selected.

4. The method of claim 1, wherein evaluating the fingerprint data for the presence of the replay attack detection data comprises comparing the set of pixels in the selected row to a previous scan of the selected row.

5. The method of claim 1, wherein the replay attack detection command further causes the fingerprint sensor to change a bias supplied to the set of pixels in the selected row of pixels during the repeated scan.

6. A biometric system comprising:
a fingerprint sensor; and
a sensor controller in communication with the fingerprint sensor through an interface, wherein the sensor controller is configured to:
generate a command set, the command set configured to cause the fingerprint sensor to conduct a scan of rows or columns of pixels to capture fingerprint data, wherein the command set includes a replay attack detection command,
wherein the replay attack detection command causes the fingerprint sensor to repeat the scan of a set of pixels in a selected row or column to capture replay attack detection data;
send the command set to the fingerprint sensor through the interface;
receive the fingerprint data from the fingerprint sensor through the interface; and
evaluate the fingerprint data for the presence of the replay attack detection data in conformity with the replay attack detection command,
wherein the replay attack detection command is selected from the set of replay attack detection commands comprising:
a repeat replay attack detection command causing the fingerprint sensor to repeat the scan of the set of pixels in a selected row or column without changing a bias supplied to the set of pixels;
an under-bias replay attack detection command causing the fingerprint sensor to decrease a bias supplied to the set of pixels in the selected row or column to an insufficient level;
an over-bias replay attack detection command causing the fingerprint sensor to increase a bias supplied to the set of pixels in the selected row or column to an excessive level;
a pixel scan time adjustment replay attack detection command causing the fingerprint sensor to adjust the pixel scan time for the scan of the set of pixels in the selected row or column; and
a gain change replay attack detection command causing the fingerprint sensor to change a gain supplied to a detected bias at the set of pixels in the selected row or column.

7. The biometric system of claim 6, wherein the sensor controller is further configured to process the fingerprint data to remove, based on the replay attack detection command, the replay attack detection data from the fingerprint data.

8. The biometric system of claim 6, wherein the sensor controller is further configured to randomly select the set of pixels in the selected column.

9. The biometric system of claim 6, wherein the sensor controller is an application-specific integrated circuit.

10. The biometric system of claim 6, wherein the sensor controller includes:
one or more computer-readable storage mediums storing computer-executable instructions for controlling the sensor controller; and
one or more processors for executing the computer-executable instructions stored in the one or more computer-readable storage mediums.

11. The biometric system of claim 6, wherein:
the sensor controller includes a scan state machine in communication with the fingerprint sensor, wherein the scan state machine is configured to control the fingerprint sensor to:
initiate a fingerprint sensor start-up sequence; and
perform a scan of pixels in the fingerprint sensor by capturing data from the columns of pixels in the fingerprint sensor in an order directed by the command set.

12. A method for detecting replay attacks in a fingerprint sensor system, the method comprising:
generating a command set, the command set causing a fingerprint sensor to scan a plurality of pixels to capture fingerprint data, wherein the command set includes one or more replay attack detection commands each causing the fingerprint sensor to capture replay attack detection data from a shape of pixels selected from a set of pixels in a selected row;

sending the command set to the fingerprint sensor; and receiving fingerprint data from the fingerprint sensor, wherein the one or more replay attack detection commands are selected from the set of replay attack detection commands comprising:

a repeat replay attack detection command causing the fingerprint sensor to repeat the scan of the set of pixels in the selected row without changing a bias supplied to the set of pixels;

an under-bias replay attack detection command causing the fingerprint sensor to decrease a bias supplied to the set of pixels in the selected row to an insufficient level;

an over-bias replay attack detection command causing the fingerprint sensor to increase a bias supplied to the set of pixels in the selected row to an excessive level;

a pixel scan time adjustment replay attack detection command causing the fingerprint sensor to adjust the pixel scan time for the scan of the set of pixels in the selected row; and a gain change replay attack detection command causing the fingerprint sensor to change a gain supplied to a detected bias at the set of pixels in the selected row.

13. The method of claim 12, further comprising:

processing the fingerprint data to remove data received from the shape of pixels to produce a fingerprint data image;

comparing the fingerprint data image to stored authorized fingerprint data images to check for a match between the fingerprint data image and an authorized fingerprint data image; and denying access to a resource protected by the fingerprint sensor system if the fingerprint data image does not match any authorized fingerprint data images.

14. The method of claim 12, wherein the shape of pixels is randomly generated.

15. The method of claim 12, wherein the shape of pixels comprises a single pixel from the plurality of pixels.

16. The method of claim 12, wherein at least one of the one or more replay attack detection commands causes the fingerprint sensor to adjust a pixel scan time for the shape of pixels.

17. The method of claim 12, wherein at least one of the one or more replay attack detection commands causes the fingerprint sensor to change a gain supplied to a detected bias at the shape of pixels.

18. The method of claim 12, wherein the command set includes a first replay attack detection command associated with a first shape of pixels and a second replay attack detection command associated with a second shape of pixels.

19. The method of claim 18, wherein at least one pixel from the plurality of pixels is in the first shape of pixels and the second shape of pixels.

* * * * *